(No Model.)
M. GROSS.
COMBINATION WIRE STRETCHER AND DOMESTIC SCALE.
No. 572,054. Patented Nov. 24, 1896.
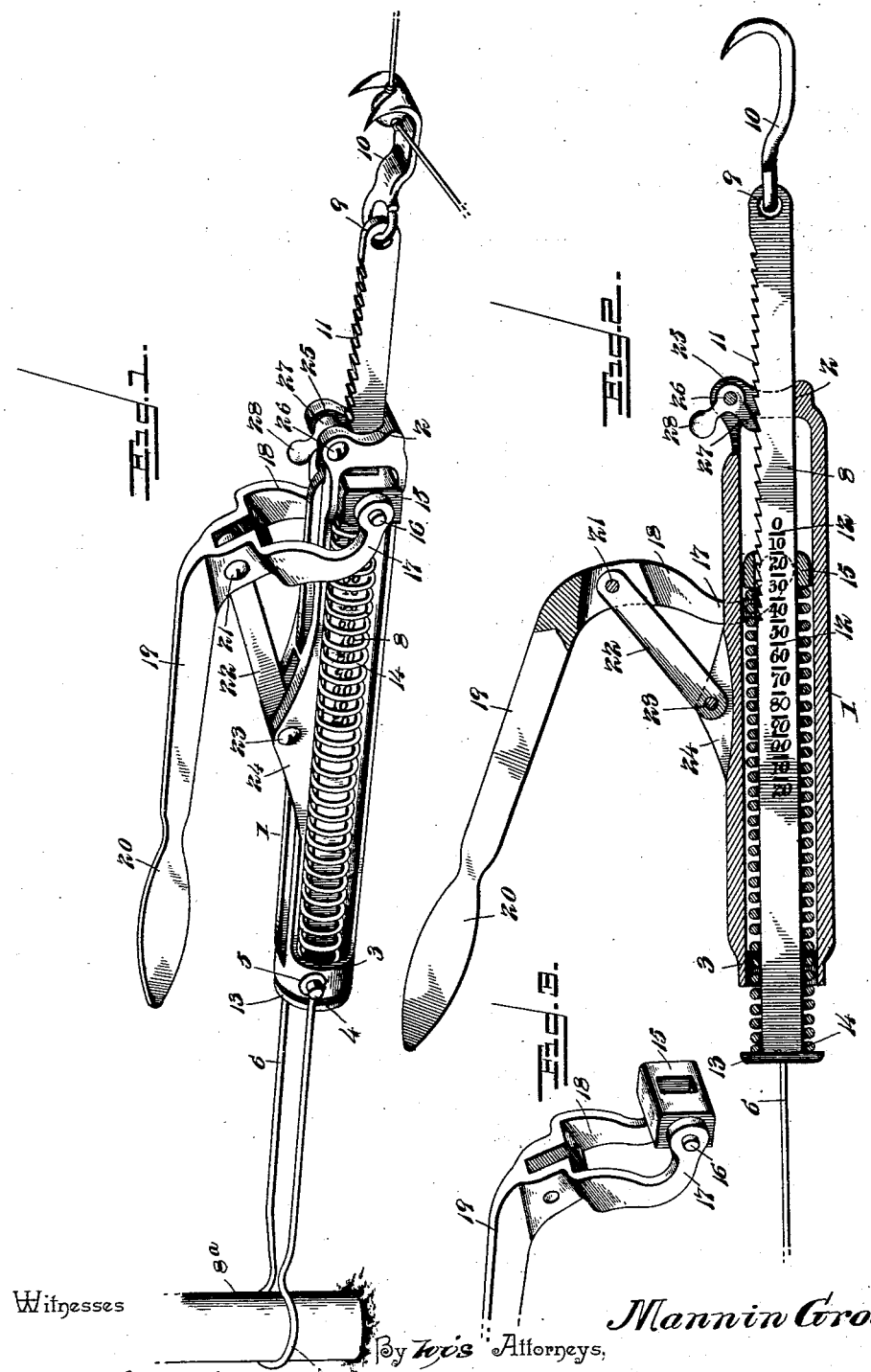
Witnesses
Inventor
Mannin Gross
By his Attorneys,
C. A. Snow & Co.

UNITED STATES PATENT OFFICE.

MANNIN GROSS, OF BURLINGTON, KANSAS.

COMBINATION WIRE-STRETCHER AND DOMESTIC SCALE.

SPECIFICATION forming part of Letters Patent No. 572,054, dated November 24, 1896.

Application filed April 4, 1896. Serial No. 586,216. (No model.)

*To all whom it may concern:*

Be it known that I, MANNIN GROSS, a citizen of the United States, residing at Burlington, in the county of Coffey and State of Kansas, have invented a new and useful Combination Wire-Stretcher and Domestic Scale, of which the following is a specification.

This invention relates to a combination wire-stretcher and domestic scale, and it has for its object to provide a device so constructed as to be adapted for wire-stretching purposes and also for weighing household or other articles.

To this end the invention is especially useful in building wire fences to provide simple and efficient means for stretching each wire to a perfectly-uniform tension and for holding the wires of the fence perfectly rigid in their stretched condition until stapled to the posts of the fence, thereby insuring an equal distribution of the strain of the wires throughout the entire fence and overcoming the objection to having some wires tighter than others, which is a very common occurrence in wire-fence building.

For wire-stretching purposes the invention is also especially designed for use in stretching the check-row wires of corn-planting machines to provide for maintaining the check-row wire at a uniform tension, whereby accurate planting at positively-regulated intervals shall be insured, which is a very necessary feature in corn planting.

A further object of the invention, as already stated, is to construct a device of the character described so that the same, without modification, can be used for weighing household or other articles.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a combination stretcher and scale constructed in accordance with this invention and shown as applied for use in stretching the check-row wire of a corn-planting machine. Fig. 2 is a central longitudinal sectional view thereof, showing the spring as partially compressed by the adjustment of the adjusting-lever. Fig. 3 is a detail in perspective of the adjusting-lever and the sliding adjusting-collar carried thereby.

Referring to the accompanying drawings, 1 designates a skeleton casing provided at one end with a squared guide-opening 2 and at the directly opposite end with a guide-ring 3 of substantially the same diameter as the width of the casing. The casing 1 is provided at diametrically opposite sides of the guide-ring 3 thereof with the offstanding pivot-studs 4, pivotally engaged by the eyes 5 at the opposite extremities of a hanger-bail 6, preferably made of stout wire and provided at the end opposite its connection with the casing 1 with a ring 7, adapted to be suitably connected with an anchor-stake 8 when the device is used in connection with a check-row wire of a corn-planting machine or with a post when the device is used for stretching the wires of a wire fence; but it will of course be understood that the hanger-bail 6 may be suspended from any convenient point of attachment to hold the device in an upright position when used as an ordinary scale for weighing purposes.

The skeleton casing 1 accommodates therein for longitudinal movement a sliding scale-bar 8. The sliding scale-bar 8 is of a greater length than the casing 1 and works through the squared guide-opening 2 and the guide-ring 3 thereof, and is provided at its end opposite the hanger-bail 6 for the casing with an eye 9, loosely engaged by a bifurcated claw-hook 10, to which is connected the wire to be stretched or the object to be weighed, and in stretching a check-row wire, as illustrated in Fig. 1, the wire passes through the bifurcation of the hook and the button of the wire is held within the hook. The scale-bar 8 is further provided in one edge, for a portion of its length, with a series of ratchet-teeth 11, on opposite sides intermediate of its ends with a series of scale-graduations 12, and at its end opposite the eye 9 with a head-plate or flange 13, against which works one end of the coiled spring 14.

The spring 14 is coiled on the scale-bar 8 within the casing 1 and is designed to work through the guide-ring 3 at one end of said casing when the scale-bar is adjusted in a direction to stretch a wire or to weigh articles connected therewith. The end of the spring 14 opposite the end which bears against the head-plate or flange 13 is adapted to be engaged by a sliding adjusting-collar 15.

The sliding adjusting-collar 15 loosely registers within the skeleton casing 1 and loosely embraces the scale-bar 8, so as to freely slide thereon and against one end of the spring to provide for compressing said spring, and said collar 15 is provided at opposite sides with the opposite rounded pivot-studs 16, pivotally engaged by the arms 17 of the fork 18 at one end of the adjusting-lever 19, the handle portion 20 of which lever is disposed in substantially an oblique angle to the fork portion 18 thereof. At its forked end the lever 19 is pivotally connected, as at 21, to one end of a link 22, the other end of which link is pivotally mounted at 23 between a pair of pivot-lugs 24, integrally projected from one side of the casing 1 at a point between the ends thereof.

The casing 1 is provided at one side of the squared guide-opening 2 at one end with a bifurcation 25, in which is pivotally mounted on the pivot 26 the gravity catch-dog 27, the point of which is adapted to ride on and engage with the ratchet-teeth 11 to provide for holding the scale-bar rigid in any adjusted position, and said dog is provided with a finger-knob 28, which is grasped by the fingers to disengage the dog from the ratchet-teeth 11 for the purpose of releasing the scale-bar 8, as desired.

In using the device for stretching wires of any kind the hanger-bail 6 is anchored to a post or stake in the manner described and the claw-hook 10 engaged with the wire. To provide for stretching the wire to the desired tension, it is simply necessary to grasp the handle end of the lever 19 and to swing the same in a direction away from the casing 1. This movement causes the collar 15 to be carried against one end of the spring 14 and to compress the spring. A continued movement of the adjusting-lever compresses the spring 14 sufficiently tight so as to move the scale-bar in a direction to stretch the wire, and this stretching action continues until the collar 15 is carried opposite the particular scale-graduation on the scale-bar, which will indicate that the wire has been stretched to the required tension. When the wire has been stretched to the desired tension, as described, the spring is entirely relieved from pressure by releasing the hold on the adjusting-lever, but the scale-bar will be rigidly held in its adjusted position by the engagement of the gravity-dog with the ratchet-teeth thereof.

By reason of the operation described it will be obvious that any number of wires may be stretched to precisely the same degree of tension, but in the use of the device as an ordinary scale it will be understood that it is simply necessary to suspend the same from any convenient point by the bail 6 and to suitably connect the articles to be weighed with the hook 10.

By adjusting the lever-handle away from the casing 1 the spring will be compressed and the scale-bar adjusted in the manner already described, the graduations on the scale-bar indicating the number of pounds of the article being weighed, and in this connection it will be noted that the adjusting-collar 15 acts in the capacity of a pointer for the scale-graduations.

The herein-described device may be used for a variety of different purposes, and changes in the form, proportion, and the minor details of construction may be resorted to without departing from the principle or sacrificing any of the advantages of this invention.

Having thus described the invention, what is claimed, and desired to be secured by Letters Patent, is—

1. In a device of the class described, a casing, a scale-bar mounted to slide in said casing and having scale graduations, a spring coiled on the scale-bar and bearing against one end thereof, and a lever-adjusted collar sliding on said scale-bar and working against the other end of the spring thereof, substantially as set forth.

2. In a device of the class described, a casing, a spring-actuated scale-bar mounted to slide longitudinally in said casing and provided in one edge with a series of ratchet-teeth, a catch-dog mounted in the casing and engaging the ratchet-teeth of said scale-bar, a spring mounted on the scale-bar and working at one end through one end of the casing and bearing against one end of the scale-bar, and a lever-adjusted collar sliding on the scale-bar and working against the other end of said spring, substantially as set forth.

3. In a device of the class described, a casing, a hanger-bail pivotally connected with one end of said casing, a scale-bar mounted to slide through the casing and provided at one end with a head-plate or flange, a series of scale graduations, and with a series of ratchet-teeth, a gravity catch-dog pivotally mounted on the casing and engaging said ratchet-teeth, a spring coiled on the scale-bar and bearing at one end against said head-plate or flange, and a lever-adjusted collar sliding on the scale-bar and working against the other end of said spring, substantially as set forth.

4. In a device of the class described, a skeleton casing provided at one end with a squared guide-opening and at the opposite end with a guide-ring, a catch-dog pivotally mounted at one side of said guide-opening, a scale-bar mounted to slide through the guide-opening and ring of said casing and provided at one end with a head-plate or flange, a series of scale graduations, and with a series of ratchet-teeth engaged by said catch-dogs, a spring coiled on the scale-bar and bearing at one end against said head-plate or flange, a collar sliding on the scale-bar and working against the other end of said spring, an adjusting-lever having a forked end pivotally connected with said sliding collar, and a link pivotally connected at one end with the casing at an intermediate point and at its other end with the adjusting-lever at an intermediate point thereof substantially as set forth.

In testimony that I claim the foregoing as my own I have hereto affixed my signature in the presence of two witnesses.

MANNIN GROSS.

Witnesses:
 G. W. NIEBERGER,
 W. H. DINSMORE.